July 27, 1954 E. A. SILVER ET AL 2,684,786
ROTATABLE METERING DISPENSER
Filed Nov. 20, 1948 4 Sheets-Sheet 1

INVENTOR.
EDWARD A. SILVER
JOHN A. SLIPHER
BY
THEIR ATTORNEY

July 27, 1954     E. A. SILVER ET AL     2,684,786
ROTATABLE METERING DISPENSER

Filed Nov. 20, 1948     4 Sheets-Sheet 3

INVENTOR.
EDWARD A. SILVER
JOHN A. SLIPHER
BY

THEIR ATTORNEY

INVENTOR.
EDWARD A. SILVER
JOHN A. SLIPHER

Their Attorney

Patented July 27, 1954

2,684,786

UNITED STATES PATENT OFFICE 2,684,786

ROTATABLE METERING DISPENSER

Edward A. Silver and John A. Slipher, Columbus, Ohio

Application November 20, 1948, Serial No. 61,186

9 Claims. (Cl. 222—167)

This invention relates to devices for delivering granular material, and more particularly to a machine for conveying and distributing measured quantities of such material to the soil.

One of the objects of this invention is to provide a device for metering, i. e., accurately measuring and delivering, granular material which comprises, in general, a revolving container having a metering cylinder in communication therewith, and which is formed with shutes forming passages aligned to provide for a gravity flow of material from the container to the cylinder and for a similar flow of excess material from the cylinder back to the container.

One of the advantages resulting from this construction is that the material in the container, for example, fertilizer or the like, remains free and loose at all times. Thus, the packing or bridging, usually encountered in equipment for this purpose and which results in an interrupted flow of material, is prevented. There is an even, free flow and uninterrupted distribution since the revolving of the supply container keeps the material in a turbulent state and disintegrates any lumps tending to form therein.

Another object of the invention is to provide a device of the type described in which metering cylinders are positioned at each end of the supply container whereby an even, continuous flow of material is obtained at a constant rate and regardless of the level of the material within the supply container. A feature of this construction is that commercial fertilizers, for example, can be transported in quantity on a farm machine and deposited in the soil at various predetermined rates, and that the device is particularly well adapted for use in supplying row crops by placement in ribbon form by either an intermittent or continuous process.

It is also an object to provide a device of the character referred to wherein the supply container and metering cylinder, or cylinders, are connected by shutes forming passages extending along the end walls of the supply container, the outer ends of the shutes being open and providing a scooping action through the material in the container as the latter revolves, and the inner ends of the passages being aligned to discharge within the metering cylinder. With this construction, there is provided a free gravity flow of material from the supply container to the metering cylinder when the container rotates to a position wherein the passages are in a substantially vertical position. In this position a gravity flow of excess material is also obtained from the metering cylinder back to the supply container.

An additional object is to provide a flange between the supply container and the metering cylinder which controls the level of the material within the metering cylinder regardless of the quantity of material present in the supply container, and also regulates the rate of discharge from the metering cylinder.

A feature of this construction is that the level of material within the metering cylinder is accurately controlled at all times by the height of the flange. This is important because the level of the material within the metering cylinder controls the rate of discharge from both the delivery and feed ends of the metering cylinder. Thus, in operation, when an oversupply of material is delivered to the metering cylinders, the excess flows back over the flange and returns to the supply container and the rate of discharge from the delivery end remains constant.

It is another object to provide a mixing and metering device for delivering an even and steady flow of granular material, such as fertilizer, to the soil, which is ruggedly constructed of few moving parts, and which is adapted for use on a farm machine.

Further objects and advantages of the present invention will be apparent from the following description, reference being had to the accompanying drawings wherein preferred forms of embodiments of the invention are clearly shown.

Figure 1:
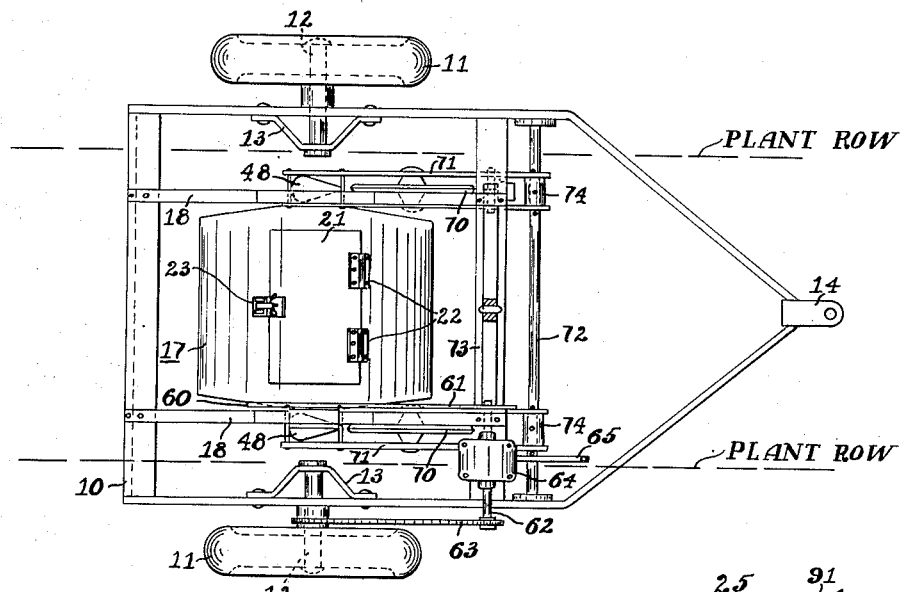
Fig. 1 is a top plan view of a farm machine showing a device for depositing fertilizer in the soil constructed in accordance with the present invention.

Referring further to the drawings, the machine shown in Fig. 1 comprises, in general, a frame 10 having a pair of ground wheels 11 supported on stationary axles 12 carried by the supports 13. The frame is provided with a hitch member 14 for attachment to a tractor, or other power means, in the usual manner.

A supply container 17 adapted to receive and transport a charge of granular material is rotatably mounted on the frame 10. A pair of support brackets 18 for the container are attached to the frame. To these brackets are attached the U bolts 19 which support the bearings 20 at each end of the container. The container is also provided with a charging door or hatch 21 hinged along the edge as seen at 22 in Fig. 1 and having a latch member 23 for locking the same in closed position.

In the preferred construction a pair of metering cylinders 25 are connected to each end wall 26 of the container. These metering cylinders are identical in construction and for brevity only one will be described herein. The construction of the preferred form of metering cylinder is most clearly illustrated in Figs. 3 and 4.

The container 17 as shown is formed with the integral end walls 26 each having four radially arranged apertures 27 therein adjacent the center of the respective wall. Formed so as to extend radially along the inside of the end walls 26, and as an integral part thereof, are a plurality of shutes as indicated at 28, 29, 30 and 31 in Fig. 4 to form passages. These shutes are open at each end and communicate between the interior of the container 17 and the interior of the cylinder 25. Each of the radially arranged apertures 27 forms a port for one of the shutes. The outer ends of these shutes are also open along one side, as indicated at 33 in Fig. 8, to provide a scooping action through the granular material in the container 17 as the latter rotates. With this construction, material is picked up in the outer ends of the shutes 28, 29, 30 and 31, as they rotate with the container, and carried upward until a vertical, or substantially vertical, position is reached in the cycle of rotation whereby a gravity flow of the material is established between the container 17 and the cylinder 25. Each of these shutes provides for a gravity flow of material from the cylinder 25 back into the container 17 when it is rotated to below the cylinder 25.

Figure 3:
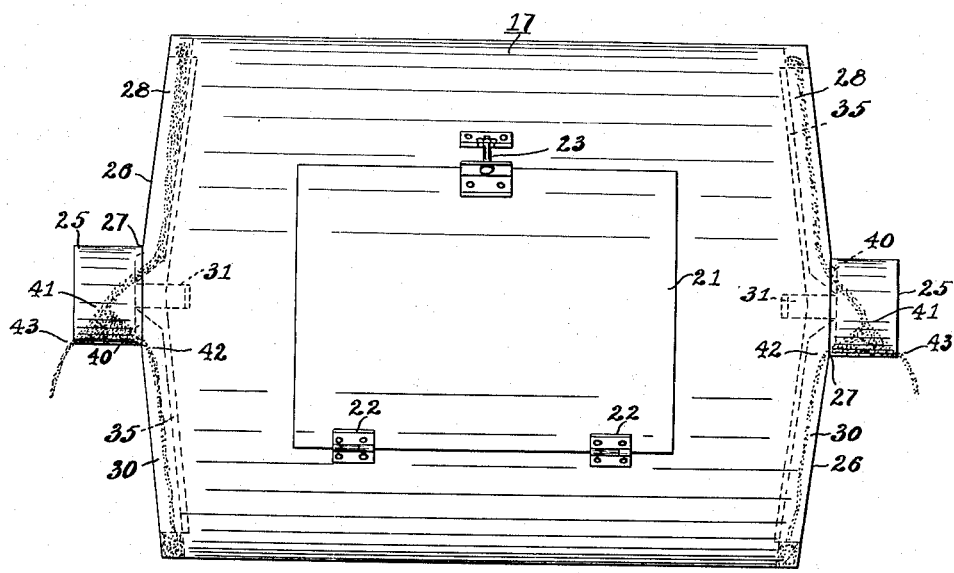
Fig. 3 is an elevational view, on an enlarged scale from that of Fig. 1, of the supply container and showing metering cylinders at each end thereof, the container has been rotated 90° from that shown in Fig. 1.
Figure 4:
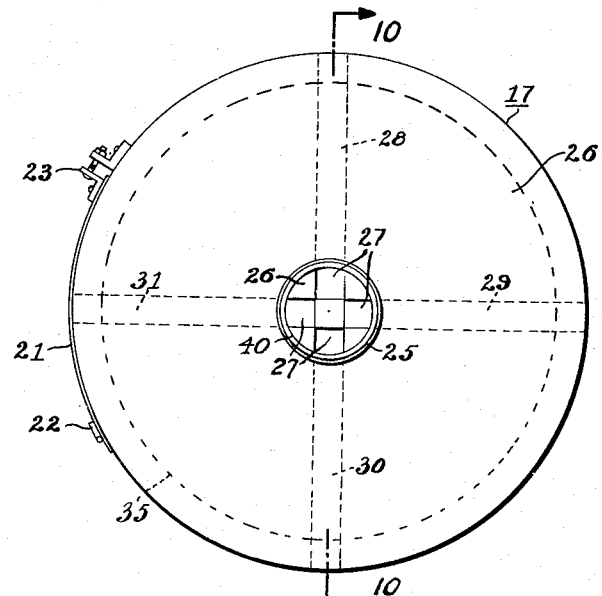
Fig. 4 is an end elevational view as seen from the right hand side of Fig. 3.

To provide for enclosing the shutes 28, 29, 30 and 31 from the inside of the container 17, a shield 35 is provided adjacent each end wall 26. As shown in Figs. 3 and 4 the periphery of this shield extends almost to the periphery of the end walls. With this construction, the end edge area between the shield and the end wall is sealed to prevent material from the container 17 collecting in the area defined between the shutes 28, 29, 30 and 31, the shield and the end wall. This construction does not interfere with the open ends of the passages as they scoop through the material in the container and facilitates cleaning the interior of the container when the hatch 21 is open. There are no crevices or ledge areas for trapping material on the interior of the container 17. It will be readily apparent, however, that if preferred the shield 35 can be omitted from the construction and the device will operate satisfactorily. In such case it is somewhat more difficult to clean the interior of the container.

It is desirable to maintain a pile of granular material within the cylinder 25 during dispensing operation. The material to be dispensed through the cylinder, flows from the pile. In order to provide this pile within the cylinder i. e. in order to prevent the material, delivered by an upper shute to the cylinder, from returning immediately, directly from the cylinder to the container, the ports to and from the cylinder, have their extreme outer edges spaced radially inwardly of the inner periphery of the cylinder. In the specific embodiment, a flange 40 is positioned between the container 17 and the cylinder 25. This flange controls the level of the material collected within the cylinder 25 as indicated at 41 in Fig. 3. In operation it will be apparent that as material discharges into cylinder 25 from one of the shutes, which has been rotated to a vertical position at the top of the container 17, for example, passage 28 (Fig. 3), it will be collected therein. The level to which this material rises in cylinder 25 will depend upon the height of the flange 40 above the lower level of the cylinder 25. Thus, if desired, a flange can be provided which closes off the apertures 27 to any extent required to raise the level of the material collected therein to a predetermined height. The height or level of the material in cylinder 25 in turn controls the rate of discharge from both feed and the delivery ends of the cylinder as indicated at 42 and 43 in Fig. 3. With this construction, any excess material fed into the cylinder 25 is discharged over the flange 40 and into the bottom of the container 17 through that shute which at that time is below the cylinder 25, for example, passage 30 (Fig. 3). The discharge 43 from cylinder 25 is conducted to the soil by a funnel tube 46 and telescoping connecting tube 47 leading to a furrow opener 48 as shown in Fig. 1.

Figures 6, 7, 8:
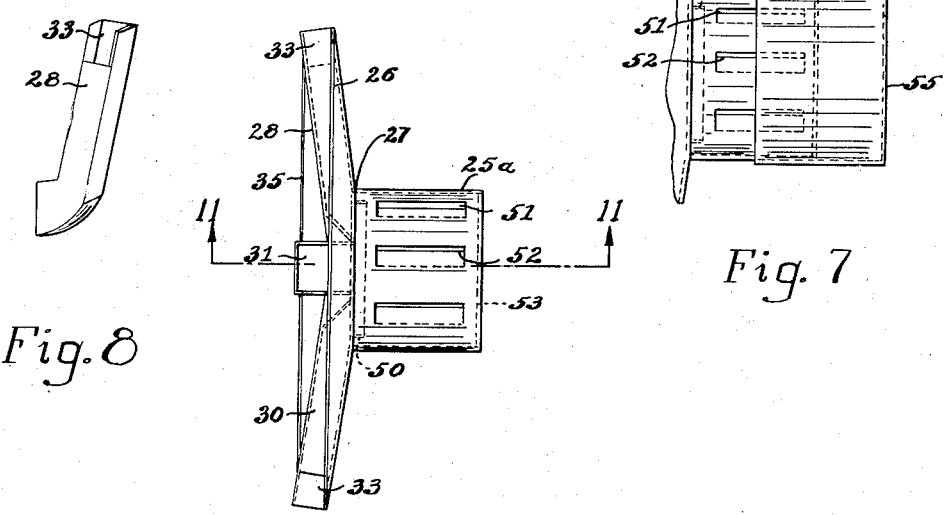
Fig. 6 is a front elevational view showing the enclosed passages along one end wall of the supply container and illustrating a modified construction of metering cylinder.
Fig. 7 is a partial, elevational view showing a closure member or cap for the metering cylinder construction illustrated in Fig. 6.
Fig. 8 is a partial, perspective view showing the construction of one of the shutes which is adapted to communicate between the supply container and the metering cylinder, the view being taken substantially 180° from that shown in Fig. 6.
Figure 10:
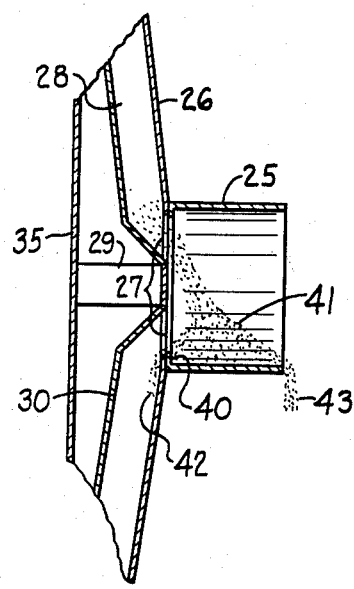
Fig. 10 is a fragmentary sectional view taken on line 10—10 of Fig. 4, but on a larger scale than Fig. 4.
Figure 11:
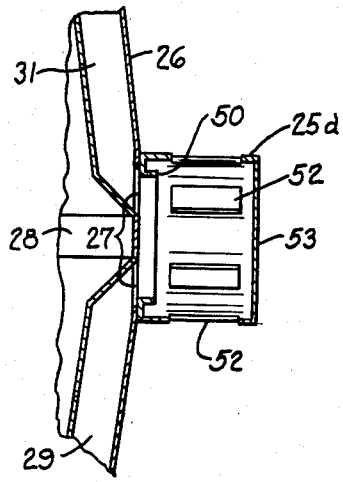
Fig. 11 is a fragmentary sectional view taken on line 11—11 of Fig. 6, but on a larger scale than Fig. 6.

A modified flange and metering cylinder construction is shown in Figs. 6 and 7. In Fig. 6 a flange 50 projecting at right angles to the aperture 27 is provided. The cylinder 25a is formed with a plurality of openings 51 in the side wall to facilitate the discharge of granular material therefrom. These openings are in the form of slots having an inturned edge 52. To prevent the discharge of material from the outer end of the cylinder in this construction an end wall 53 is provided to close that end. In this construction all discharge of material is from the slots 51. In Fig. 7, the cylinder 25a is shown provided with a closure member or cap 55 which is adjustably received over the outer end of the cylinder by means of a slip fit. The position of the cap can be varied from full open to full closed to provide for further regulation of the rate of discharge or to stop the discharge of material entirely.

Figure 9:
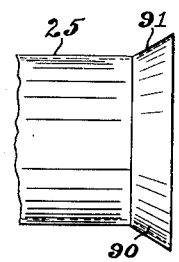
Fig. 9 is a partial, elevational view showing a modified construction for the discharge end of the metering cylinder.

In Fig. 9 the outer or discharge end of the metering cylinder 25 is provided with a bell shaped flange 90. This flange flares outwardly and upwardly, as indicated at 91, at an angle of approximately 30 degrees from the horizontal side wall of the cylinder. In one form of the construction, wherein the internal diameter of cylinder 25 is about two inches, the flange 90 extends beyond the end of the cylinder for approximately one-half inch. This construction has been found to provide sufficient bevel and width to facilitate the discharge of material from the outer end of cylinder 25, particularly when the container 17 is rotated at relatively slow speeds. At these speeds it has been found that certain types of fertilizer, for example, tend to lump or break over the straight edge of the outer end of cylinder 25 when the flange 90 is not used. The smooth, even discharge flow is interrupted and tends to pulsate. With the flange 90, however, the flow is prevented from lumping or breaking over the outer discharge end and remains smooth and even. It is to be understood, however, that the flange construction 90 is not required on the metering cylinder 25 when a normal rotation speed of container 17 is maintained.

Figure 2:
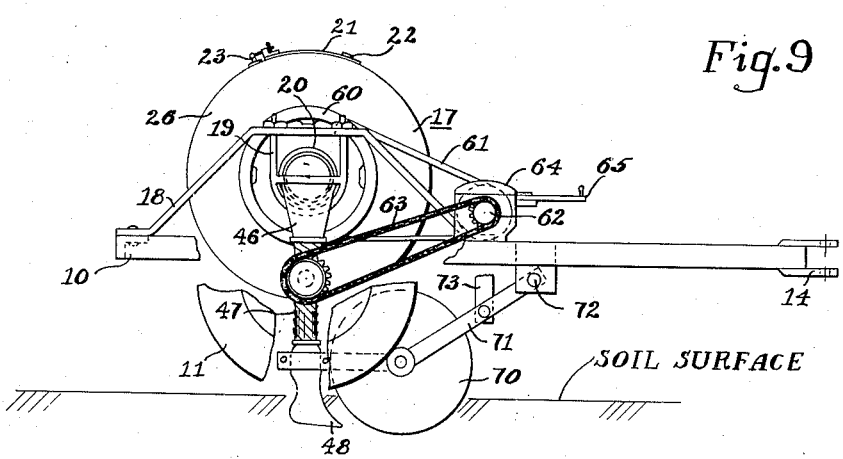
Fig. 2 is a partial, side elevational view of the machine illustrated in Fig. 1.

Referring further to Figs. 1 and 2, the container 17 and cylinder 25 are rotated by means of a V pulley 60. This pulley is driven by the V belt 61 connected to the drive shaft 62. Power is transmitted to shaft 62 by means of the chain and sprocket drive 63 connected to one of the ground wheels 11. A speed change gear box 64 and operating lever 65 are also provided to control the speed at which the container is rotated.

A pair of rolling coulters 70, as well as the furrow openers 48, are supported by the yokes 71. These yokes are pivotally connected at their upper ends to the pull rod 72. Lifting links 73 are connected to the yokes 71 to provide for raising and lowering the coulters 70 and the furrow openers 48. In the preferred construction the links 73 are connected to a hydraulically operated unit for raising and lowering the same. There is also provided an adjustment member 74 for laterally moving the yokes relative to the plant rows.

Figure 5:
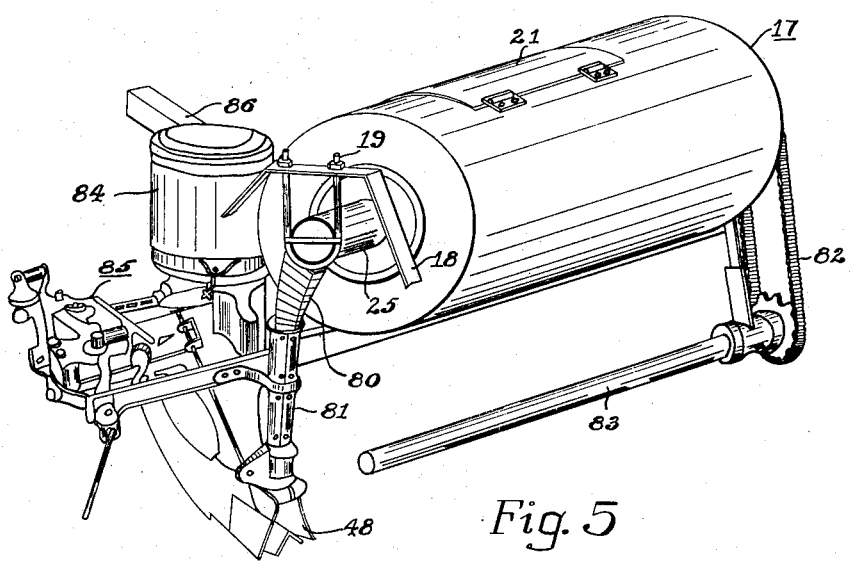
Fig. 5 is a partial, perspective view showing the device including the supply container and metering cylinder, mounted as an attachment on a seed planter.

Referring to Fig. 5, the container 17 and a metering cylinder 25 are shown mounted on a farm implement such as a corn or cotton planter. In this modification a somewhat different form of funnel tube, as indicated at 80, is connected to the discharge end of the cylinder 25. This tube in turn connects with the boot 81 and the furrow opener 48 as shown. The container is rotated by means of the drive chain 82 connected to a gear on one end thereof and to the drive shaft 83 on the other. Power is supplied to the drive shaft 83 in the usual manner. The seed container is shown at 84 and the control mechanism therefor at 85, a portion of the main frame being indicated at 86.

In operation, as the container 17 with its assembly of shutes 28, 29, 30 and 31 revolves the open ends 33 of the passages scoop up material as they leave the uppermost level of the material within the container. Then, when each of the shute passages in turn approaches a vertical, or near vertical position, in the cycle of rotation, the material picked up is carried by the force of gravity down through the passage and into the metering cylinder 25. To prevent substantially large lumps of material from entering and plugging the open outer ends of the passages a wire guard (not shown) can be placed across the open ends to prevent the entrance of any such lumps.

To vary the rate of discharge, and to achieve a wide range of applications, the container is driven at various speeds through operation of the gear change 64. Power to rotate the container is obtained from the ground wheels upon which the device is mounted, from a separate ground driven wheel, or from a power take-off connected to a prime mover such as a tractor.

Charging of the container 17 is accomplished through the hatch 21. By releasing the tension of the V belt 61 the container 17 is rotated manually until the hatch 21 is at the upper position. The container is then locked in this position until the charging is completed. Thereafter, the hatch 21 is closed and the latch 23 fastened to insure a tight fit.

As the container revolves the granular material therein is maintained in a constant state of turbulence which facilitates mixing and the reduction of lumps. The material is thus maintained in a loose state and free from bridging conditions.

A twin delivery of the material is obtained directly from the container 17 through the metering cylinder positioned at each end. This construction facilitates maintaining an even, steady flow of two streams of material and thus eliminates the inaccuracies encountered in the conventional operation wherein a single stream is divided into two ribbons as it leaves the supply container. Furthermore, a single delivery can be maintained by closing off one of the metering cylinders with a closure member or cap if desired.

While the forms of embodiments of the present invention as herein disclosed constitute preferred forms, it is to be understood that other forms might be adopted, all coming within the scope of the claims which follow.

We claim:

1. A metering device for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its axial length, the outer end of the cylinder being open for passage of granular material to the exterior of the cylinder to thus dispense such material; and a plurality of shutes rotatable with the container, each shute having the inner end thereof communicating with the exterior of the cylinder and the outer end thereof communicating with the inner peripheral portion of the container for delivering by gravity the material from the container to the shelf of the cylinder and for delivering by gravity the excess material from the cylinder to the container as the container and shutes are rotated.

2. A metering device for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its length, said cylinder being connected with the container and rotated therewith, and the outer end of the cylinder being open for passage of granular material to the exterior of the cylinder to thus dispense such material; and a plurality of shutes rotatable with the container, each shute having the inner end thereof communicating with the exterior of the cylinder and the outer end thereof communicating with the inner peripheral portion of the container for delivering by gravity the material from the container to the shelf of the cylinder and for delivering by gravity the excess material from the cylinder to the container as the container and shutes are rotated.

3. A metering device for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its axial length, the outer end of the cylinder being open for passage of granular material to the exterior of the cylinder to thus dispense such material, at least one of said end walls having radially arranged ports, the extreme outer edge of said ports lying radially inwardly of the inner periphery of the cylinder; and a plurality of radially extending shutes rotatable with the container, each shute having the inner end thereof registering with one of said ports and the outer end thereof communicating with the inner peripheral portion of the container for delivering by gravity the material from the container to the shelf of the cylinder and for delivering by gravity the excess material from the cylinder to the container as the container and shutes are rotated.

4. A metering device for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its axial length, said cylinder having an outlet for passage of granular material for dispensing such material; an inner end wall for the cylinder, said end wall having radially arranged ports, the extreme outer edge of said ports lying radially inwardly of the inner periphery of the cylinder; and a plurality of radially extending shutes rotatable with the container, each shute having the inner end thereof registering with one of said ports and the outer end thereof communicating with the inner peripheral portion of the container for delivering by gravity the material from the container to the shelf of the cylinder and for delivering by gravity the excess material from the cylinder to the container as the container and shutes are rotated.

5. A metering device for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its axial length, the outer end of said cylinder flaring outwardly radially; an inner end wall for the cylinder, said end wall having radially arranged ports, the extreme outer edge of said ports lying radially inwardly of the inner periphery of the cylinder; and a plurality of radially extending shutes rotatable with the container, each shute having the inner end thereof registering with one of said ports and the outer end thereof communicating with the inner peripheral portion of the container for delivering by gravity the material from the container to the shelf of the cylinder and for delivering by gravity the excess material from the cylinder to the container as the container and shutes are rotated.

6. A dispenser for granular material, such as fertilizer, comprising in combination, a vehicle adapted to be moved over the ground; a container, having side and end walls, for the granular material to be dispensed, such container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its axial length, the outer end of the cylinder being open for passage of granular material to the exterior of the cylinder to thus dispense such materials; and flow directing means for feeding the material from the container to the shelf of the cylinder, said flow directing means serving to deliver the excess material from the cylinder to the container as the container is rotated.

7. A dispenser for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially and externally of the container, said cylinder having an inner surface forming a completely circular shelf throughout its axial length, said cylinder being connected with the container and rotated therewith, and the outer end of the cylinder being open for the passage of granular material to the exterior of the cylinder to thus dispense such material; and guide means for feeding the material from the container to the shelf of the cylinder, said guide means serving to deliver the excess material from the cylinder to the container when the container is rotated.

8. A dispenser for granular material, such as fertilizer, comprising in combination, a vehicle adapted to be moved over the ground, a container, having side and end walls, for the granular material, to be dispensed, said container being carried by the vehicle and mounted for a rotation about a substantially horizontal axis; means for rotating the container; a horizontally elongated tubular dispensing cylinder arranged axially and externally of the container, said cylinder having an inner surface forming a completely circular shelf throughout its axial length, said cylinder having an outlet for passage of granular material for dispensing such material; and guide means for feeding the material from the container to the shelf of the cylinder, said guide means serving to deliver the excess material from the cylinder to the container when the container is rotated.

9. A dispenser for granular material, such as fertilizer, comprising in combination, a vehicle adapted to be moved over the ground; a container, having side and end walls, for the granular material, to be dispensed, said container being carried by the vehicle and mounted for rotation about a substantially horizontal axis; means for rotating the container; a horizontally elongated tubular dispensing cylinder arranged axially of the container, said cylinder having an inner surface forming a completely circular shelf throughout its axial length, the outer end of said cylinder flaring outwardly radially; and flow directing means for feeding the material from the container to the shelf of said cylinder, said flow directing means serving to deliver the excess material from the cylinder to the container as the container is rotated.

References Cited in the file of this patent

UNITED STATES PATENTS

| Number | Name | Date |
|---|---|---|
| 426,664 | Donahoo | Apr. 29, 1890 |
| 801,627 | Wunsch | Oct. 10, 1905 |
| 1,533,435 | Lokey | Apr. 14, 1925 |
| 2,394,453 | Huszar | Feb. 5, 1946 |